(12) United States Patent
Seike et al.

(10) Patent No.: US 7,027,805 B1
(45) Date of Patent: Apr. 11, 2006

(54) MOBILE COMMUNICATION TERMINAL

(75) Inventors: Masaki Seike, Kanagawa (JP); Tetsuya Yamaguchi, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 855 days.

(21) Appl. No.: 09/630,584

(22) Filed: Aug. 3, 2000

(30) Foreign Application Priority Data

Aug. 5, 1999 (JP) ............................... P 11-222593

(51) Int. Cl.
*H04M 3/00* (2006.01)
*G06F 12/00* (2006.01)

(52) U.S. Cl. ...................... 455/418; 707/202; 707/203; 711/103; 711/104

(58) Field of Classification Search ............. 455/426.1, 455/466, 428, 419, 558, 575.1, 550.1, 418; 707/204, 202, 203; 713/310, 321, 323; 714/13, 714/24; 711/100, 101, 102, 103, 104
See application file for complete search history.

(56) References Cited

U.S. PATENT DOCUMENTS

| | | | | |
|---|---|---|---|---|
| 4,876,738 | A * | 10/1989 | Selby ....................... 455/435.1 |
| 5,471,518 | A * | 11/1995 | Barber et al. ............ 455/550.1 |
| 5,603,038 | A * | 2/1997 | Crump et al. ................ 713/310 |
| 5,937,434 | A * | 8/1999 | Hasbun et al. ............... 711/170 |
| 6,009,497 | A * | 12/1999 | Wells et al. ................. 711/103 |
| 6,064,880 | A * | 5/2000 | Alanara ...................... 455/419 |
| 6,243,831 | B1 * | 6/2001 | Mustafa et al. ............... 714/24 |
| 6,317,755 | B1 * | 11/2001 | Rakers et al. ................ 707/204 |
| 6,397,351 | B1 * | 5/2002 | Miller et al. ................... 714/13 |
| 6,510,316 | B1 * | 1/2003 | Shimizu ...................... 455/418 |

FOREIGN PATENT DOCUMENTS

JP 4-145596 5/1992
JP 06-338195 12/1994

* cited by examiner

*Primary Examiner*—Rafael Perez-Gutierrez
(74) *Attorney, Agent, or Firm*—Pearne & Gordon LLP (57) ABSTRACT

A mobile communication terminal comprises an information managing portion 1, and a nonvolatile storing medium 2 attached to the information managing portion 1, and the nonvolatile storing medium 2 has a plurality of memory areas for storing same information items in sequence. According to this configuration, when storing of the information items, e.g., the time information, etc., whose access frequency is high are updated by using the nonvolatile storing medium, the burden imposed on the nonvolatile storing medium can be reduced by using different areas. Thus, the information items having a high updating frequency, e.g., the time information, etc. can be stored in the nonvolatile storing medium whose lifetime is short and then employed.

6 Claims, 6 Drawing Sheets

MOBILE COMMUNICATION TERMINAL

BACKGROUND OF THE INVENTION

The present invention relates to a mobile communication terminal such as a mobile telephone, pager, PHS, etc. that can prevent loss of information by storing necessary information when a low voltage operation occurs.

In the conventional mobile communication terminal, personal information such as a telephone directory and saved messages which are seldom updated and frequency information, address information, etc. which are updated many times but loss of which is not permitted are recorded in a nonvolatile storing medium such as a flash ROM, EEPROM, etc. whereas information (information items) such as time information, etc. which are updated many times are recorded in a volatile storing medium such as RAM, etc.

Also, as for the information stored in the volatile storing medium, loss of the information stored in the volatile storing medium such as RAM, etc. due to a low voltage operation is prevented by using a secondary battery, etc.

However, upon managing back-up information in the conventional mobile communication terminal, if the information items, e.g., time information, etc. which are updated many times are recorded in the nonvolatile storing medium such as EEPROM, etc., such nonvolatile storing medium is degraded and in turn the lifetime of the mobile communication terminal itself is affected, and thus it is difficult to realize such management. Also, if the update number of times is reduced, the time information, etc. which need a real-time property lose their value. Hence, there is no means except that such information are stored in the volatile storing medium such as RAM, etc.

Also, in order not to lose the information stored in the volatile storing medium such as RAM, etc., the secondary battery is needed. This results in the increase of cost of the mobile communication terminal.

SUMMARY OF THE INVENTION

Therefore, it is an object of the present invention to provide a mobile communication terminal which can execute back-up information management by storing information items, e.g., time information, etc., which are updated many times, in sequence into a plurality of memory areas of a nonvolatile storing medium so as to prevent the degradation of the nonvolatile storing medium.

Also, it is another object of the present invention to provide a mobile communication terminal that can execute back-up information management by storing necessary information so as to prevent loss of the information when a low voltage operation is caused.

In order to overcome the above problem, a mobile communication terminal of the present invention comprises an information managing portion, and a nonvolatile storing medium attached to the information managing portion, wherein the nonvolatile storing medium has a plurality of memory areas for storing same information items.

According to this configuration, when storing of the information items, e.g., the time information, etc., whose access frequency is high are updated by using the nonvolatile storing medium such as EEPROM, etc., the burden imposed on the nonvolatile storing medium can be reduced. Thus, the information items having a high updating frequency, e.g., the time information, etc. can be stored in the nonvolatile storing medium whose lifetime is short and then employed.

Also, the mobile communication terminal of the present invention has a function for attaching numbers indicating updated sequences when the information are stored in the nonvolatile storing medium.

According to this configuration, the information managing portion can decide the updated sequences of the same information items stored over a plurality of areas of the nonvolatile storing medium.

In addition, a mobile communication terminal of the present invention comprises an information managing portion, and a nonvolatile storing medium and a volatile storing medium attached to the information managing portion, and has functions of checking consistency between the nonvolatile storing medium and the volatile storing medium in an initial state such as turning-ON of a power supply, looking up the information stored in the nonvolatile storing medium if lack of the consistency of the information stored in the volatile storing medium is caused, and checking normality of the information stored in the volatile storing medium by comparing it with the information stored in the nonvolatile storing medium unless lack of the consistency of the information stored in the volatile storing medium is caused.

According to this configuration, it is possible to utilize effectively the information stored in the nonvolatile storing medium such as RAM, which has a high possibility to lack the consistency of the information but stores the latest information.

DETAILED DESCRIPTION OF THE PREFERRED EMBODIMENTS

Embodiments of the present invention will be explained with reference to FIG. 1 to FIG. 7 hereinafter.

First Embodiment

Figure 1:
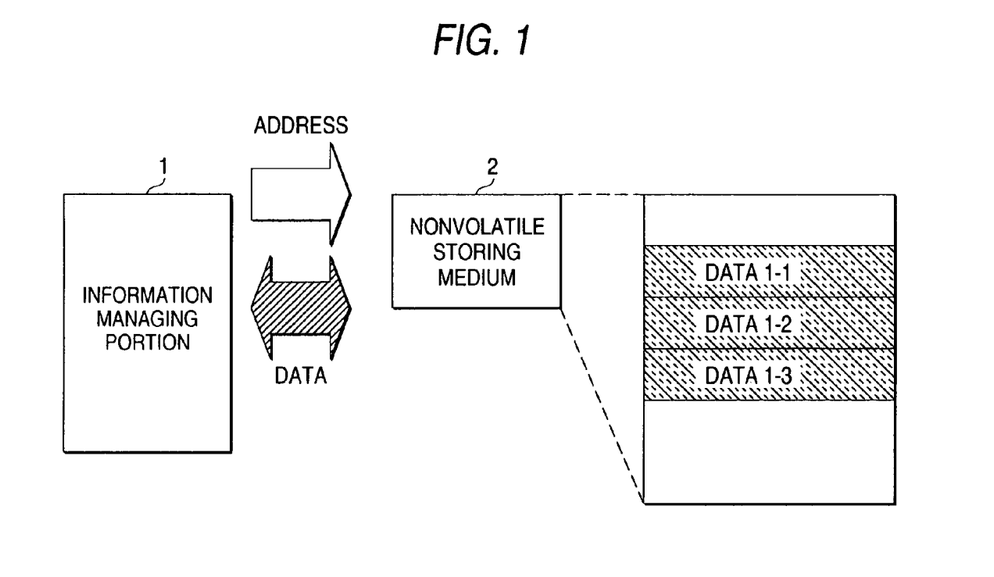
FIG. 1 is a view showing a management configuration of a mobile communication terminal for executing back-up information management according to a first embodiment of the present invention.

FIG. 1 shows a management configuration of a mobile communication terminal for executing back-up information management according to a first embodiment of the present invention.

In FIG. 1, an information managing portion 1 instructs a nonvolatile storing medium 2 of an update or reference address, and then the nonvolatile storing medium 2 executes updating or looking-up of the data in response to this. Here, in the mobile communication terminal for executing the back-up information management of the present invention, upon updating, the information managing portion 1 does not update a single information item in only a single memory area of the nonvolatile storing medium 2 every time but updates information items in a plurality of memory areas sequentially.

For example, in the case that there exists the time information whose data is updated once in three minutes, the writing number of times in one memory area a day becomes 480 number of times when the time information is stored in EEPROM (whose writing area is fixed to one area only) as one of the nonvolatile storing medium. Since it is said that normally the lifetime of EEPROM is one million number of times in writing, the lifetime is assumed as about 2000 days (about six years) based on this fact.

Then, if three writing areas are employed, the writing number of times in one memory area a day becomes 160 number of times. That is, the lifetime becomes about 6000 days (about eighteen years).

In the case that a product which has ten years as the term of guarantee of the product is to be fabricated, the term of guarantee of the product comes up to six years if the EEPROM is utilized by the former means whereas the term of guarantee of the product can be attained if the EEPROM is utilized by the latter means.

Therefore, information items, e.g., time information, etc. which are updated many times can be stored in the nonvolatile storing medium such as EEPROM, etc. by executing the back-up information management as shown in the first embodiment of the present invention. As a result, such information items can be employed not to affect the lifetime of the mobile communication terminal itself, and also a cost of the mobile communication terminal can be reduced.

Second Embodiment

Figure 2:
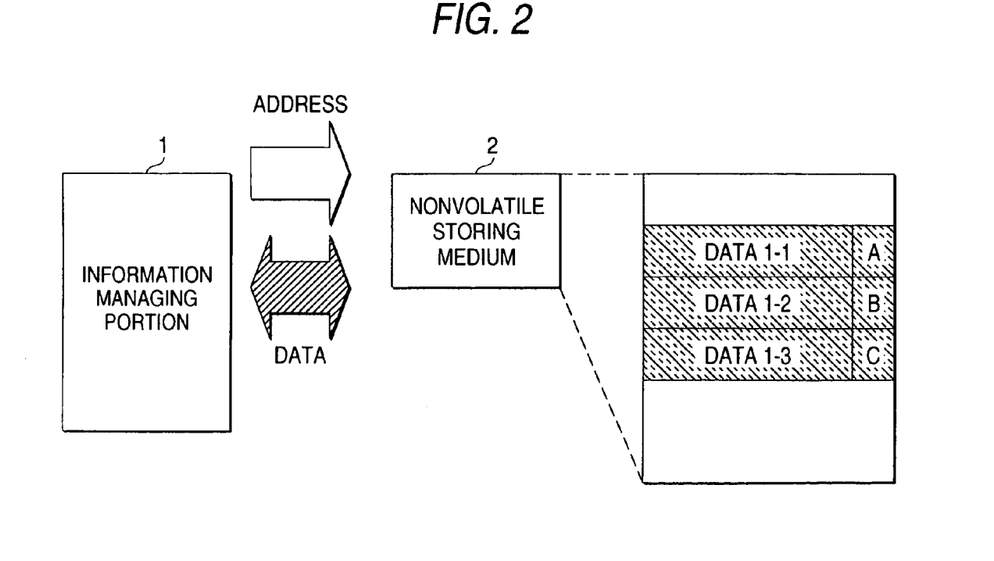
FIG. 2 is a view showing a management configuration of a mobile communication terminal for executing back-up information management according to a second embodiment of the present invention.

FIG. 2 shows a management configuration of a mobile communication terminal for executing back-up information management according to a second embodiment of the present invention.

In FIG. 2, the management configuration of the mobile communication terminal for executing back-up information management according to the second embodiment is almost similar to that of the mobile communication terminal for executing back-up information management according to the first embodiment. But there is such a difference that numbers (A to C) indicating loading sequences are stored in a plurality of memory areas (three memory areas Data 1-1 to Data 1-3 herein) belonging to the nonvolatile storing medium 2.

Figure 3:
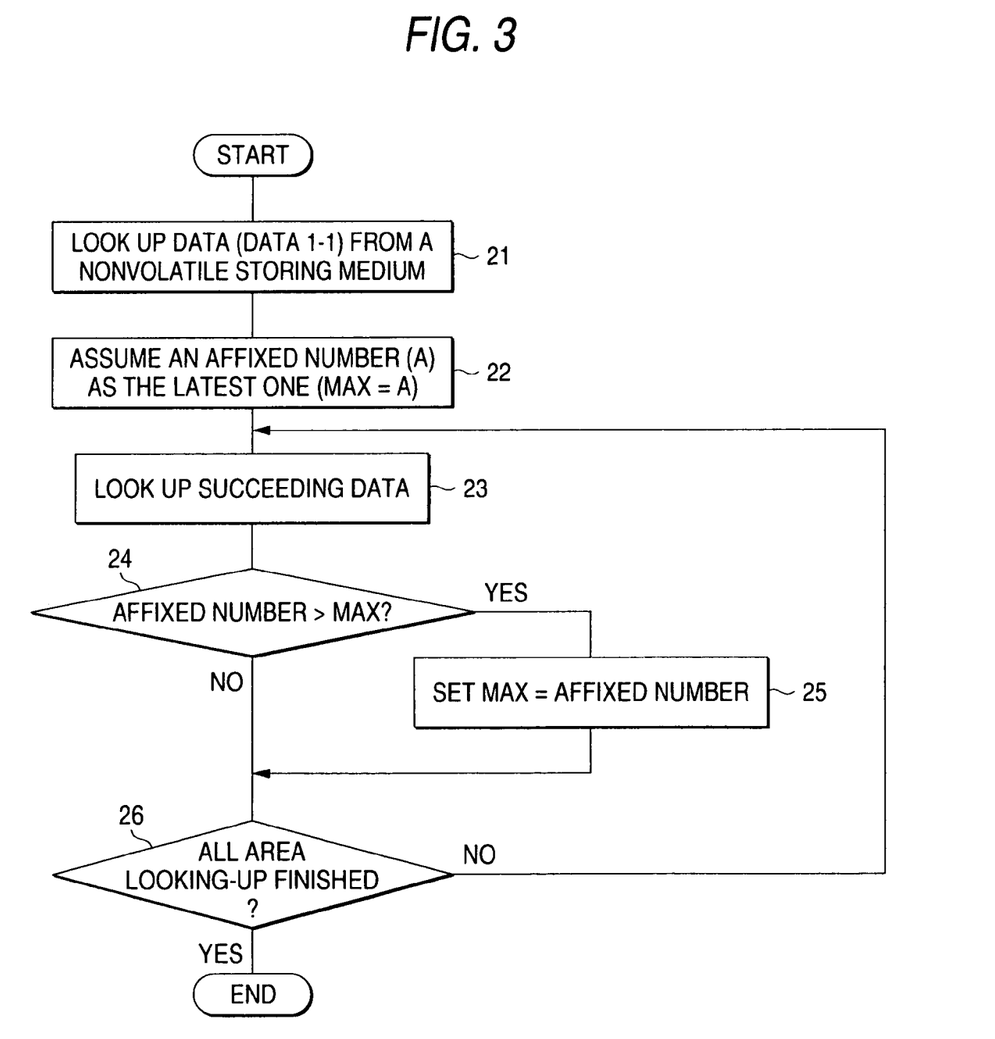
FIG. 3 is a flowchart having algorithm for deciding the latest information from a plurality of areas of a nonvolatile storing medium, in the mobile communication terminal according to the second embodiment of the present invention.

FIG. 3 shows a flowchart having algorithm for deciding the latest information by using the numbers (A to C) stored in a plurality of memory areas based on the management configuration shown in FIG. 2. In this case, the numbers (A to C) stored in FIG. 2 are assigned in the ascending order in this example, and then such numbers are corrected to return to an initial value once again when such number reaches a certain value. However, if such numbers are assigned in the descending order, it is possible to render the mobile communication terminal to execute the similar operation.

In the flowchart in FIG. 3, first of all, a head number (A is this example) in a plurality of memory areas is looked up from a nonvolatile memory portion (process 21) and is assumed as the latest one (process 22). Then, the number in the succeeding area is looked up (process 23), and compared with the latest number (A herein) (process 24). Then, if the number in the succeeding are is larger than the latest number, the number in the succeeding area is assumed as the latest one (process 25). After this process is applied to all objective areas (process 26), it is possible to say the data stored in the area, to which the number being assumed finally as the latest one among them, is assigned as the latest data.

According to this, it is feasible to search the latest information based on the same information stored in a plurality areas of the nonvolatile storing medium. Thus, even when the latest information such as time information, etc. are requested, it is possible to respond such request.

Third Embodiment

Figure 4:
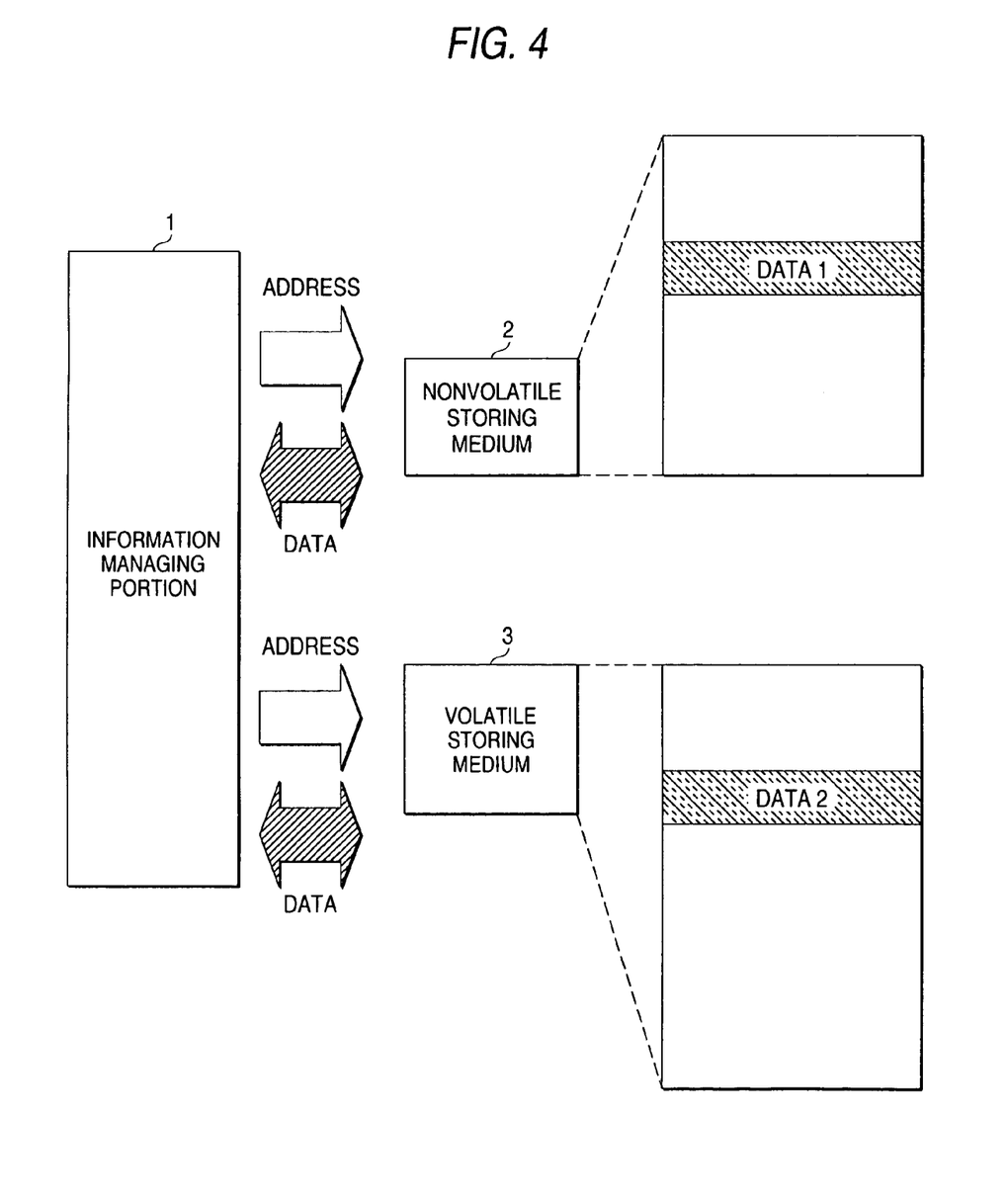
FIG. 4 is a view showing a management configuration of a mobile communication terminal for executing back-up information management according to a third embodiment of the present invention.

FIG. 4 shows a management configuration of a mobile communication terminal for executing back-up information management according to a third embodiment of the present invention.

In FIG. 4, the information managing portion 1 has the nonvolatile storing medium 2 and the volatile storing medium 3 both being attached to the information managing portion 1.

Figure 5:
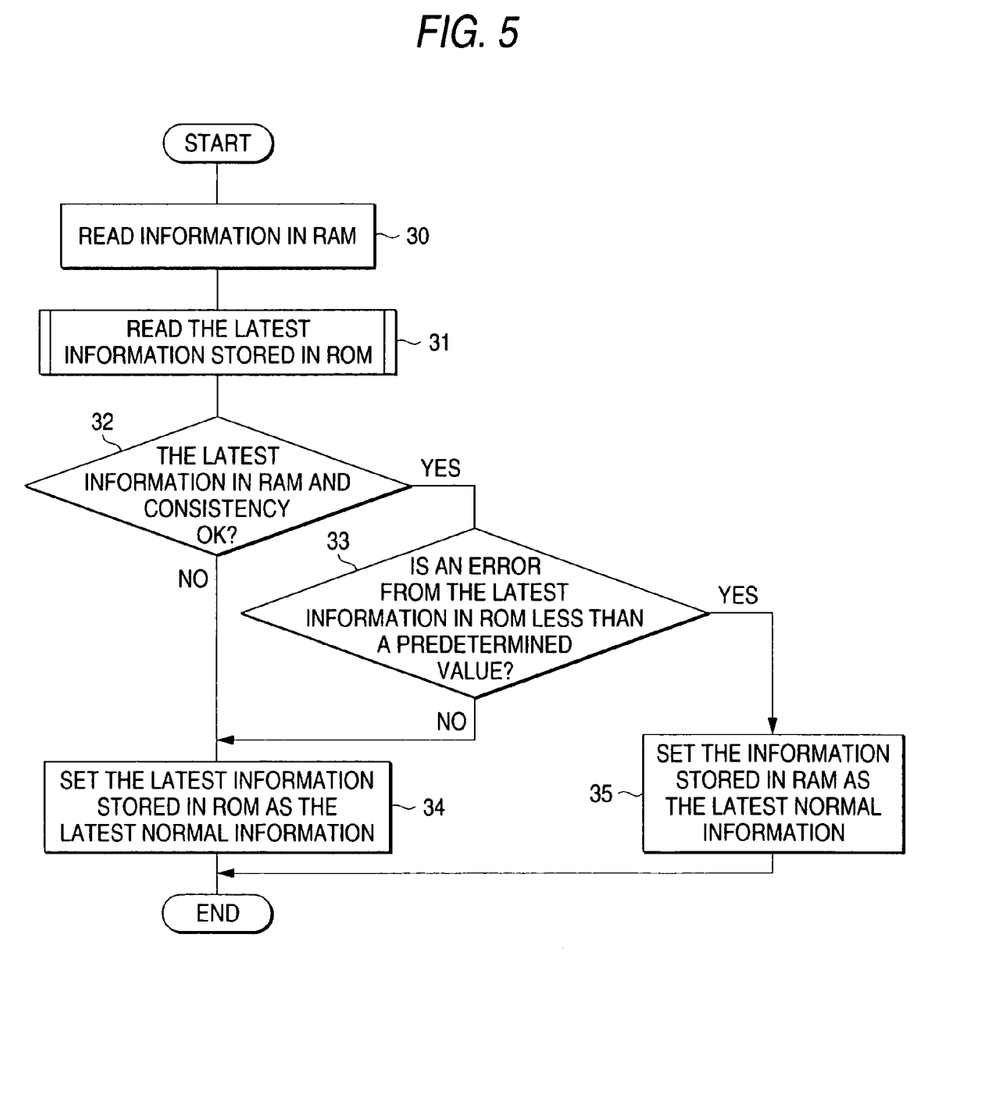
FIG. 5 is a flowchart having algorithm for checking consistency and normality of information stored in the nonvolatile storing medium and the volatile storing medium in the mobile communication terminal for executing back-up information management according to the third embodiment of the present invention.

FIG. 5 shows a flowchart having algorithm for checking consistency (whether or not the wrong information is stored) and normality (whether or not this information may be employed as new data) of information stored in the volatile storing medium 3.

In process 30 and process 31 in FIG. 5, the information managing portion 1 looks up the data stored in the volatile storing medium 3 and the nonvolatile storing medium 2. In this case, the process 31 must select the latest information when plural reference data are stored in the nonvolatile storing medium 2. In the situation at this time (FIG. 4), since the data is stored in a single area, there is no necessary to take account of this especially.

In turn, process 32 is carried out to check whether or not the data looked up by the volatile storing medium 3 is not the wrong data. For example, since February is present in the time information but 13-th month is not present, such 13-th month is the wrong data. Also, it is checked in the process 32 whether or not the data looked up by the volatile storing medium 3 is the latest information.

If both conditions are satisfied (the looked-up data is not the wrong information and the information in the volatile storing medium 3 is the latest information), the information is compared with the latest information in the nonvolatile storing medium 2. Here, as the comparison with the nonvolatile storing medium 2, for example, in the case of the time information, process 33 is carried out to check whether or not there is not a considerable difference between the latest information in the nonvolatile storing medium 2 and the information in the volatile storing medium 3. (For example, if the information in the nonvolatile storing medium 2 is 10:20 but the information in the volatile storing medium 3 is 19:11, there is a remarkable difference between them. That is, there is high possibility that the information in the volatile storing medium 3 contains any error. On the contrary, if the information in the volatile storing medium 3 is 10:21 in contrast to the information in the nonvolatile storing medium 2, such a possibility is very high that the information in the volatile storing medium 3 has been updated to 10:21.)

If the above conditions are satisfied, the information stored in the volatile storing medium 3 is set as the latest normal information (process 35). In contrast, unless the conditions are satisfied in process 32 and process 33, the information stored in the nonvolatile storing medium 2 is set as the latest normal information (process 34).

This algorithm makes it possible to check whether or not the information stored in the volatile storing medium 3 coincides with the updated information precisely. Since the information stored in the volatile storing medium 3 is updated frequently rather than the nonvolatile storing medium 2, there is a high possibility that the latest information is stored in the volatile storing medium 3.

It should be noted that terms of ROM and RAM in FIG. 5 are used as the normal terms representing the nonvolatile storing medium and the volatile storing medium respectively.

Fourth Embodiment

Figure 6:
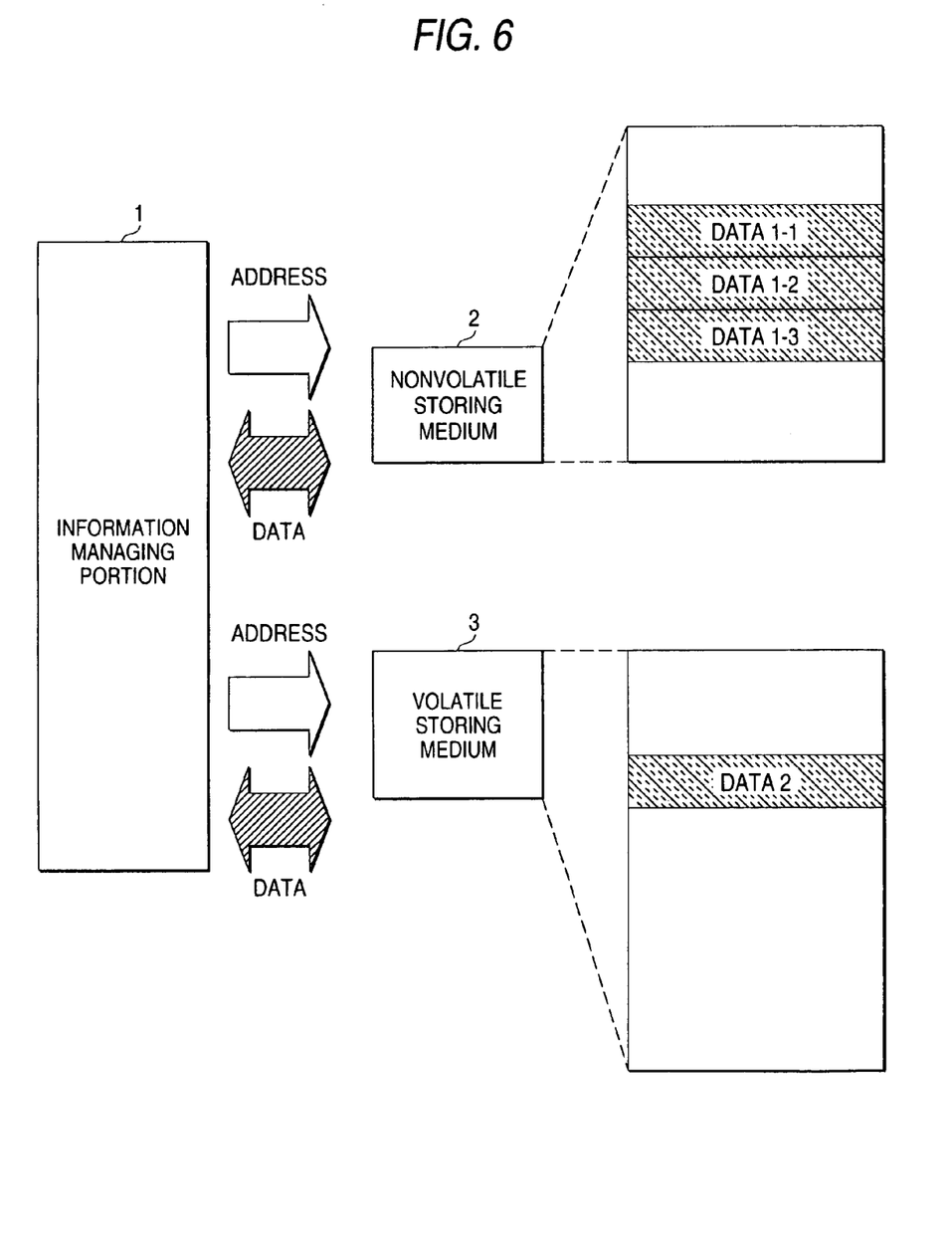
FIG. 6 is a view showing a management configuration of a mobile communication terminal for executing back-up information management according to a fourth embodiment of the present invention.

FIG. 6 shows a management configuration of a mobile communication terminal for executing back-up information management according to a fourth embodiment of the present invention. According to comparison of the configuration in FIG. 6 with the configuration in FIG. 4, they are different in that a plurality of memory areas for storing the same information items belonging to the nonvolatile storing medium 2 are provided, but remaining portions are identical.

As can be seen from this configuration, FIG. 6 shows the configuration obtained by combining the configurations in FIG. 1 and FIG. 4 together. The loading number of times into the same area of the nonvolatile storing medium 2 can be reduced rather than the configuration in FIG. 4. Thus, the lifetime of the nonvolatile storing medium 2 can be extended.

Fifth Embodiment

Figure 7:
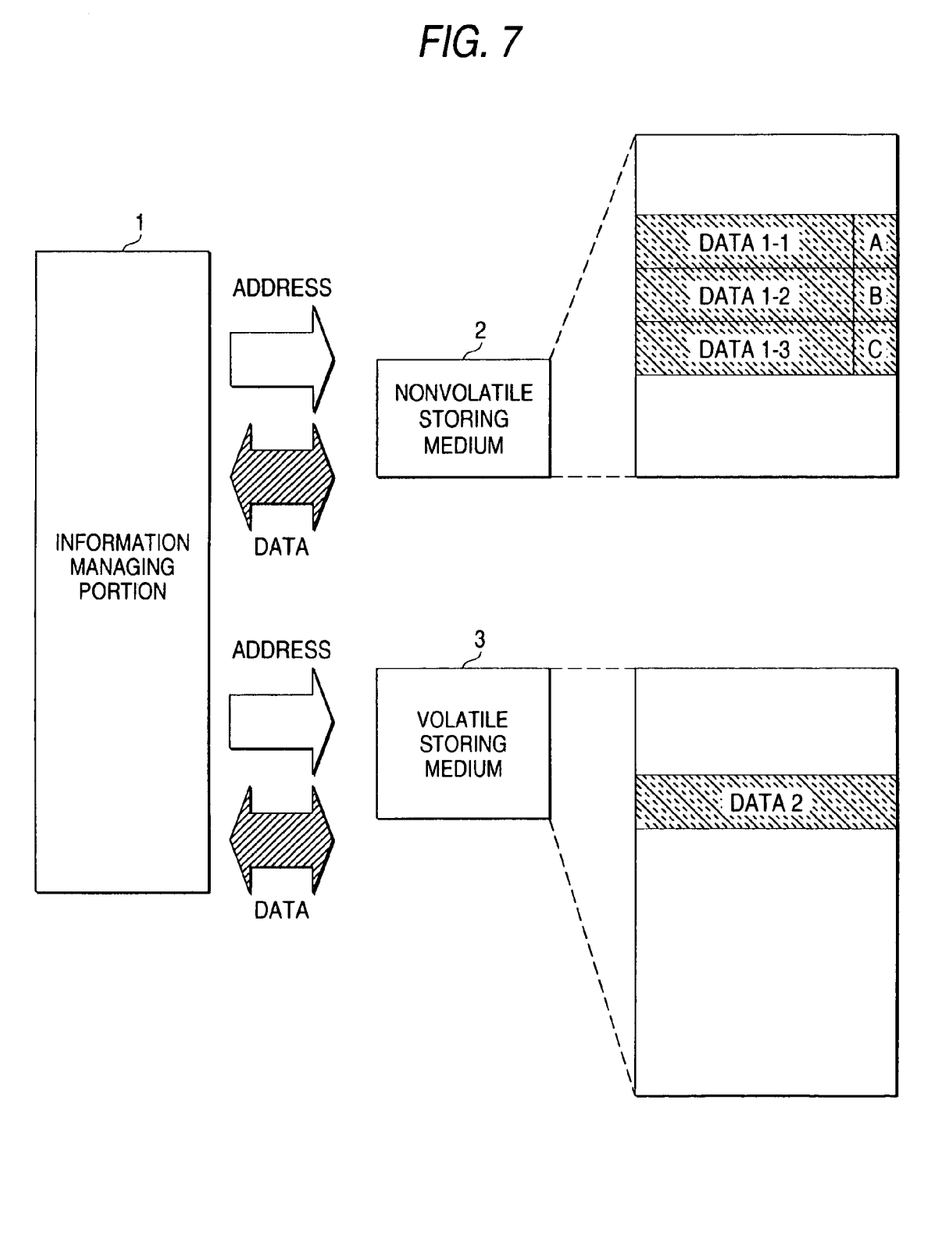
FIG. 7 is a view showing a management configuration of a mobile communication terminal for executing back-up information management according to a fifth embodiment of the present invention.

FIG. 7 shows a management configuration of a mobile communication terminal for executing back-up information management according to a fifth embodiment of the present invention. According to comparison of the configuration in FIG. 7 with the configuration in FIG. 6, they are different in that numbers are affixed to a plurality of memory areas for storing the same information items belonging to the nonvolatile storing medium 2 to indicate the updated sequences, but remaining portions are identical.

As can be seen from this configuration, FIG. 7 shows the configuration obtained by combining the configurations in FIG. 2, FIG. 3, and FIG. 4 together. The information updated at the latest time can be decided by looking up the numbers affixed to a plurality of memory areas belonging to the nonvolatile storing medium 2.

As described above, according to the present invention, the information items such as the time information, etc., which are employed in the mobile communication terminal such as the mobile telephone, PHS, the pager, or the like and whose updating frequency is high, can be loaded in sequence into a plurality of areas of the nonvolatile storing medium such as EEPROM, flash ROM, etc. Therefore, the degradation of the nonvolatile storing medium whose lifetime is short can be prevented, and accordingly the term of quality guarantee of the mobile communication terminal can be extended.

In addition, consistency between the nonvolatile storing medium and the volatile storing medium is checked in the initial state such as turning-ON of the power supply, etc., and then the information stored in the nonvolatile storing medium can be referred to if lack of the consistency of the information stored in the volatile storing medium is caused, otherwise the information stored in the volatile storing medium can be compared with the information stored in the nonvolatile storing medium unless lack of the consistency of the information stored in the volatile storing medium is caused. Therefore, the information stored in the volatile storing medium that has a high possibility to store the latest information can be utilized effectively.

What is claimed is:

1. A mobile communication terminal comprising:
an information managing portion;
a nonvolatile storage medium; and
a volatile storage medium, wherein the nonvolatile storage medium and the volatile storage medium are both managed by the information managing portion; and wherein said information managing portion stores identical information into the nonvolatile storage medium and the volatile storage medium, and further wherein said information managing portion then compares the identical information stored in both the nonvolatile storing medium and the volatile storage medium for consistency during an initial state, and further wherein said information managing portion retrieves the information stored in the nonvolatile storage medium if the information stored in the volatile storage medium is not consistent with the information stored in the nonvolatile storage medium.

2. A mobile communication terminal as claimed in claim 1, wherein said nonvolatile storage medium has a plurality of memory areas each for storing a value of an information item, and wherein said information managing portion attaches management numbers indicating updated sequences to information having a higher update frequency to the nonvolatile storage medium, with the attaching occurring at the time of the updating of the information, and further wherein said information managing portion decides which updated sequences of information having the higher update frequency based on management numbers when the information managing portion looks up the information stored in the nonvolatile storing medium.

3. A mobile communication terminal as claimed in claim 1, wherein said nonvolatile storage medium has a plurality of memory areas each for storing a value of an information item, and said information managing portion stores sequentially the values of the information items into the plurality of memory areas of the nonvolatile storing medium.

4. The mobile communication terminal as claimed in claim 3, wherein said information managing portion associates a management number with each stored value of the information item, with the management number indicating an update of the stored value, wherein the information managing portion utilizes the management number to select the updated value of the information item stored in the nonvolatile storage medium.

5. A mobile communication terminal as claimed in claim 1, wherein said information managing portion checks for a normality of the information by comparing with the information stored in the nonvolatile storing medium unless a lack of consistency of the information stored in the volatile storing medium has occurred.

6. A mobile communication terminal as claimed in claim 5, wherein said information managing portion stores the identical information into the nonvolatile storing medium and the volatile storing medium at different times.

* * * * *

UNITED STATES PATENT AND TRADEMARK OFFICE
CERTIFICATE OF CORRECTION

PATENT NO. : 7,027,805 B1  
APPLICATION NO. : 09/630584  
DATED : April 11, 2006  
INVENTOR(S) : Seike et al.

Page 1 of 1

It is certified that error appears in the above-identified patent and that said Letters Patent is hereby corrected as shown below:

On the title page

Item (54), Title, please delete the title "MOBILE COMMUNICATION TERMINAL" and replace it with the following title
- - "MOBILE COMMUNICATION TERMINAL WITH ENHANCED MEMORY MANAGEMENT AND METHOD THEREFORE" - -.

Signed and Sealed this

Fourteenth Day of November, 2006

JON W. DUDAS  
*Director of the United States Patent and Trademark Office*